(12) United States Patent
Biollo

(10) Patent No.: US 9,432,473 B2
(45) Date of Patent: Aug. 30, 2016

(54) ONLINE PRESENCE MANAGEMENT FOR WEB SITES

(75) Inventor: Damian Biollo, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 544 days.

(21) Appl. No.: 12/707,455

(22) Filed: Feb. 17, 2010

(65) Prior Publication Data

US 2011/0202602 A1  Aug. 18, 2011

(51) Int. Cl.
*H04L 12/58* (2006.01)
*H04L 29/08* (2006.01)
*G06Q 10/06* (2012.01)
*G06Q 10/10* (2012.01)
*H04L 12/18* (2006.01)

(52) U.S. Cl.
CPC ............ *H04L 67/24* (2013.01); *H04L 12/581* (2013.01); *H04L 12/5815* (2013.01); *H04L 12/5835* (2013.01); *H04L 51/043* (2013.01); *G06Q 10/06* (2013.01); *G06Q 10/109* (2013.01); *H04L 12/18* (2013.01)

(58) Field of Classification Search
CPC ....... H04L 67/24; H04L 67/18; H04L 67/22; H04L 67/32; H04L 67/36; H04L 51/043; H04L 51/14; G06Q 10/10; G06Q 10/109
USPC ....... 709/203, 204, 205, 206, 207, 216, 217, 709/219, 223, 224
See application file for complete search history.

(56) References Cited

U.S. PATENT DOCUMENTS

| | | | | |
|---|---|---|---|---|
| 6,640,241 B1 * | 10/2003 | Ozzie | .................. | H04L 12/1813 709/204 |
| 7,574,528 B2 * | 8/2009 | Day | ........................ | H04L 67/24 709/217 |
| 2002/0143877 A1 * | 10/2002 | Hackbarth | ........... | G06Q 10/107 709/205 |
| 2003/0014491 A1 * | 1/2003 | Horvitz | ................ | G06Q 10/109 709/206 |
| 2003/0018726 A1 * | 1/2003 | Low | ...................... | H04L 12/581 709/206 |
| 2003/0110228 A1 * | 6/2003 | Xu et al. | ....................... | 709/207 |
| 2005/0050157 A1 * | 3/2005 | Day | ........................ | H04L 67/24 709/217 |
| 2006/0075091 A1 * | 4/2006 | Beyda et al. | .................. | 709/224 |
| 2007/0021971 A1 * | 1/2007 | McKinney | ............. | G06Q 10/06 455/456.1 |
| 2007/0067443 A1 * | 3/2007 | Seligmann | ............ | H04L 67/104 709/224 |
| 2007/0071209 A1 * | 3/2007 | Horvitz | ................ | G06Q 10/109 379/201.06 |
| 2008/0005235 A1 * | 1/2008 | Hegde et al. | .................. | 709/204 |
| 2008/0320096 A1 * | 12/2008 | Szeto | ................... | G06Q 10/109 709/207 |
| 2009/0043843 A1 * | 2/2009 | Milewski | ................ | H04L 51/04 709/204 |
| 2009/0191851 A1 * | 7/2009 | Hutt | ........................ | H04L 67/24 455/414.1 |
| 2009/0265429 A1 * | 10/2009 | Gestsson | ............. | H04L 12/5835 709/204 |
| 2009/0299934 A1 * | 12/2009 | Horvitz | ................ | G05B 19/404 706/45 |
| 2010/0135278 A1 * | 6/2010 | Dingler | .................... | H04L 12/14 370/352 |
| 2010/0332597 A1 * | 12/2010 | Varney | ................ | H04L 12/5815 709/204 |

* cited by examiner

*Primary Examiner* — Barbara Burgess
(74) *Attorney, Agent, or Firm* — Schwegman Lundberg & Woessner, P.A.

(57) ABSTRACT

Systems and methods to provide online presence management are provided. A presence message is received from a browser associated with a user. One or more channels indicated by the presence message are determined, each channel being associated with an activity of the user. A presence state for each of the one or more channels are then determined, and a presence storage may be updated. Presence information comprising the presence state for the user may be provided to browsers of subscribers who subscribed to the same one or more channels. The presence information may be provided without an explicit request from the browsers.

23 Claims, 9 Drawing Sheets

| CHANNELS FOR USER5 | SUBSCRIBER1 | SUBSCRIBER2 |
|---|---|---|
| USER 5 | SUBSCRIBED | SUBSCRIBED |
| ACTIVITY15 | SUBSCRIBED | SUBSCRIBED |
| ACTIVITY17 | NOT SUBSCRIBED | NOT SUBSCRIBED |
| ACTIVITY20 | SUBSCRIBED | NOT SUBSCRIBED |

FIG. 7a

| USER5 ONLINE | SUBSCRIBER1 | SUBSCRIBER2 |
|---|---|---|
| USER 5 | ONLINE | ONLINE |
| ACTIVITY15 | | |
| ACTIVITY17 | | |
| ACTIVITY20 | ACTIVE | |

FIG. 7b

| USER5 ONLINE | SUBSCRIBER1 | SUBSCRIBER2 |
|---|---|---|
| USER 5 | ONLINE | ONLINE |
| ACTIVITY15 | ACTIVE | ACTIVE |
| ACTIVITY17 | | |
| ACTIVITY20 | ACTIVE | |

FIG. 7c

| USER5 OFFLINE | SUBSCRIBER1 | SUBSCRIBER2 |
|---|---|---|
| USER 5 | ONLINE | ONLINE |
| ACTIVITY15 | ACTIVE | ACTIVE |
| ACTIVITY17 | | |
| ACTIVITY20 | | |

FIG. 7d

ONLINE PRESENCE MANAGEMENT FOR WEB SITES

FIELD

The present disclosure relates generally to web sites, and in a specific example embodiment, to online presence management for web sites.

BACKGROUND

Determining presence of other users within a system is often desired. Conventional systems may require a browser to continuously broadcast a presence indication message to a server (e.g., using extensible messaging and presence protocol (XMPP)). Typically, the presence detected is one of a general offline, online, or away (e.g., online but have not performed any actions within a certain time period). Because the browser is continuously broadcasting its presence, more network traffic may be required to track presence. For example, over 70% of XMPP inter-server traffic may be presence data, of which 60% may be redundantly transmitted.

BRIEF DESCRIPTION OF DRAWINGS

Various ones of the appended drawings merely illustrate example embodiments of the present invention and cannot be considered as limiting its scope.

FIG. 7a-FIG. 7d provide a graphical illustration of FIG. 5.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for online presence management of web sites are provided. In example embodiments, users in a hosted network are able to determine status or presence state of other users within groups. The groups can be diverse such as an association of people that make use of a collaborative website or tool (e.g., project groups, common interest groups, social networking groups, committees, boards, company teams, intercompany teams, standards groups). For example, the group may be a group directed to a particular software project at work, a stamp collecting interest group, a single parent support group, and so forth. These groups, also known as activities, comprise an area where documents, pictures, business tools (e.g., pro/con tables, polls), and other forms of information may be shared between group members. In some embodiments, the groups are private groups. A user may join a private group by invitation or as a creator and owner of the private group. As will be discussed in more detail below, each user and private group may be associated with different channels of communication. These channels of communication include a presence channel (hereinafter referred to as a "channel") for each user and activity. Channels are part of the Comet protocol. Each Comet message is a JSON formatted text message where the JSON object includes a "channel" property.

In accordance with example embodiments, a presence message is received from a browser associated with a user. The presence message may be generated by the browser when a presence state change occurs and returned to a presence management system. One or more channels indicated by the presence message are determined, each channel being associated with an activity or the user. A presence state change for each of the one or more channels is then identified, and a presence storage may be updated accordingly. Presence information comprising the presence state change for the user may be provided to browsers of subscribers (e.g., other online users) who subscribe to the same one or more channels. The presence information may be provided whenever a change in presence occurs and without an explicit request from the browsers.

Figure 1:
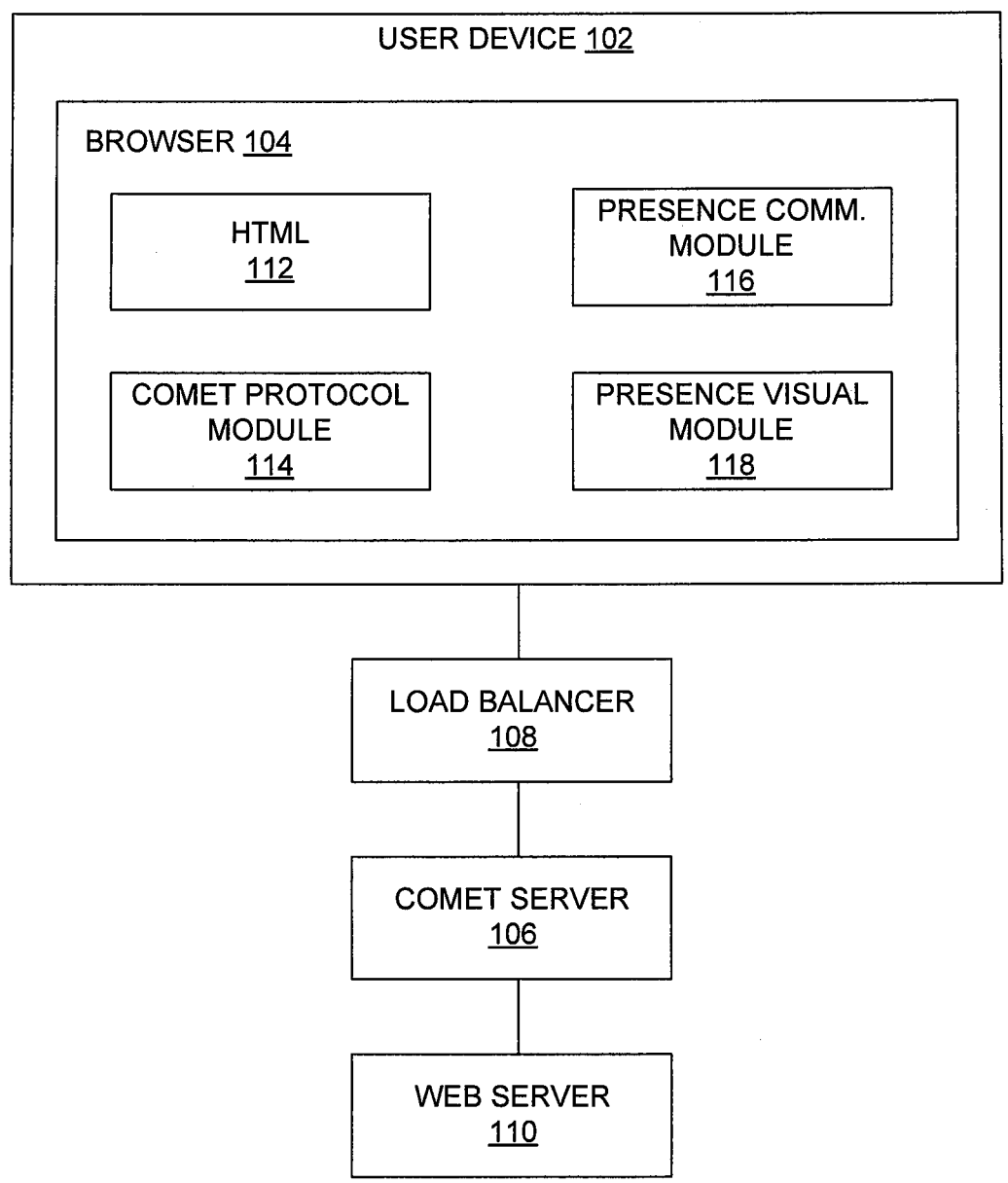
FIG. 1 is a block diagram illustrating an example of an environment in which example embodiments may be deployed.

With reference to FIG. 1, an embodiment of an environment 100, in which example embodiments of the present invention may be deployed, is shown. A user device 102 having a browser 104 is communicatively coupled to a Comet server 106. The user device 102 may be coupled via any one or more of a local or wide area network (e.g., the Internet). While a Comet server 106 is provided, it is noted that other types of servers may be utilized to provide the presence management system. For example, other types of AJAX or JavaScript-enabled servers may be used. The Comet server 106 will be discussed in more detail in connection with FIG. 2.

In example embodiments, the browser 104 communicates with various components of the environment 100 in order to obtain data for display at the user device 102. As such, the browser 104 may send a HyperText Transfer Protocol (HTTP) request to a web server 110. The web server 110 renders HTML 112, which includes JavaScript and links to JavaScript files associated with presence management. The HTML 112 is then returned to the browser 104. When the browser 104 executes the JavaScript, online presence management may be triggered.

The links from the HTML 112 access the JavaScript files on a load balancer 108 and the JavaScript files may be downloaded to the browser 104 in some embodiments. Because the JavaScript files seldom change, these files may be statically downloaded in accordance with one embodiment. The browser 104 may perform a handshake with the Comet server 106 and establish a protocol via a Comet protocol module 114. The protocol enables connection and tracking of presence at the browser 104.

The JavaScript files may be associated with or used by a presence communication module 116. The presence communication module 116, when executing the JavaScript files, exchanges publication or subscription presence information with the Comet server 106. For example, the presence communication module 116 may publish presence information (e.g., "I am online and active in Activity20.") to the Comet server 106 whenever a change in presence occurs. The presence communication module 116 may also receive presence information (e.g., User5 is online and active in Activity15) regarding other users when the user of the user device 102 is a subscriber to channels associated with the other users. A presence visual module 118 takes the presence information received from the Comet server 106 and visually presents the presence information on the browser 104.

While only one Comet server 106 is shown in FIG. 1, it is noted that more than one Comet server 106 may be utilized. In these embodiments, an active message queue (AMQ) may be present in front of the web server 110 and be coupled with a plurality of Comet servers. The AMQ allows any server process to connect to it with a port number using some network socket communication. As such, the AMQ may communicate messages back and forth between different server processes and different Comet servers. In the present case, presence state may be exchanged between the different Comet servers.

Figure 2:
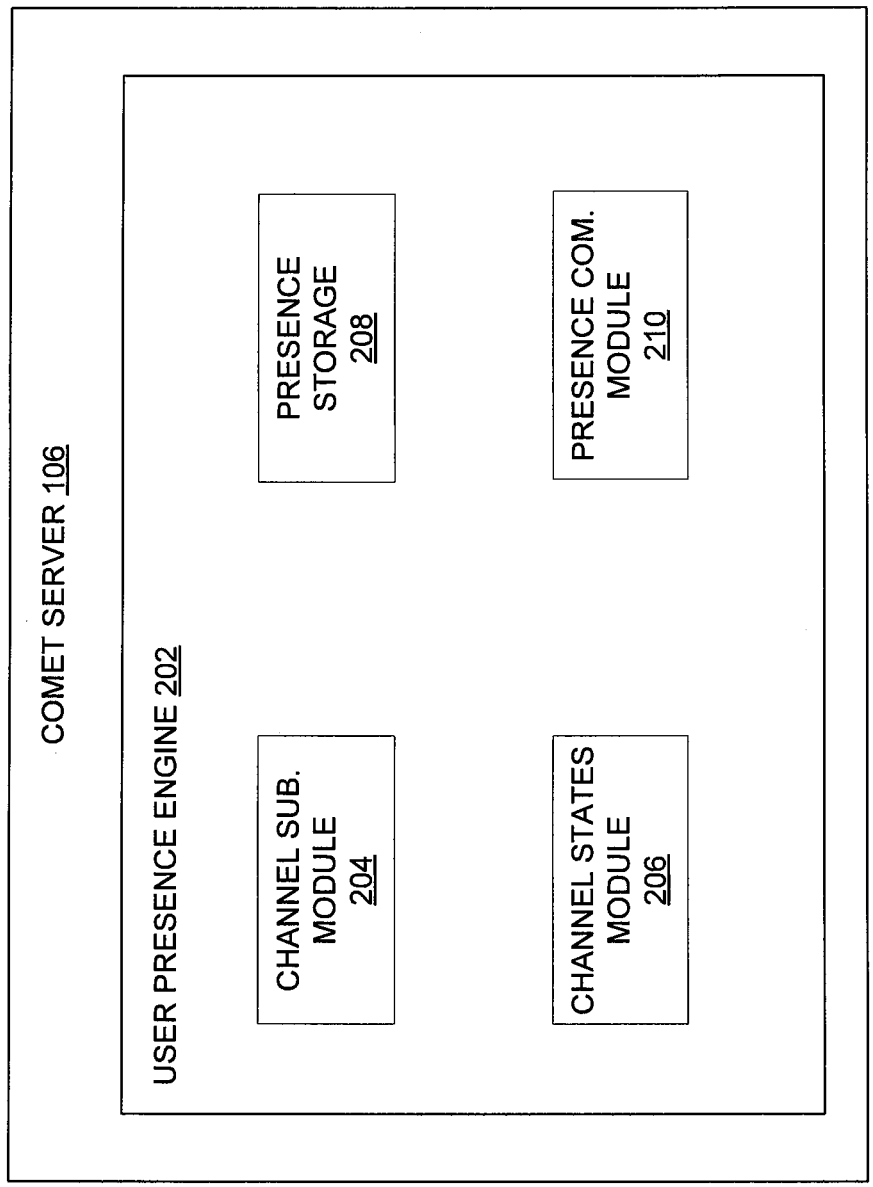
FIG. 2 is a block diagram illustrating an example embodiment of a Comet server.

Referring now to FIG. 2, an example block diagram of the Comet server 106 is shown. Among other components, the Comet server 106 comprises a user presence engine 202 for conducting presence management. The user presence engine 202 comprises a channel subscription module 204, a channel states module 206, a presence storage 208, and a presence communication module 210.

The channel subscription module 204 handles subscription to activities and their associated channels. In some embodiments, a user may be invited to join an activity via the channel subscription module 204. In other embodiments, the user may create an activity and invite other users to join the activity. The activity may be created by the channel subscription module 204 or another component of the Comet server 106. Once an activity is created or a user joins a pre-existing activity, the corresponding information may be stored to the presence storage 208 by the channel subscription module 204. A user is allowed to subscribe to channels for activities that the user is invited to or created. In other words, a first user may be allowed to subscribe to channels associated with other users in the same activities as the first user.

In some embodiments, the channel subscription module 204 also determines which channels the user (and browser associated with the user) is subscribed to when the user accesses the hosted network associated with the Comet server 106. For instance, when the user joins an activity, the user may decide to be a subscriber to the corresponding channel for the activity (e.g., Activity20). Additionally, the user may, in some cases, be a subscriber to channels associated with one or more of the other users (e.g., User5) in the same activity. The channel subscription module 204 determines these channels in order to provide instructions to the channel states module 206 and presence communication module 210 to provide the presence information to subscribers of those channels.

It is noted that the user subscribes to channels that the user is interested in and not all channels with which the user is associated (e.g., all channels for activities/groups that the user is a member). For example, the user may be a member of several activities, but is not interested in determining presence state for some of these activities. In these cases, the user does not need to subscribe to the channels associated with these activities not of interest.

The channel states module 206 determines presence state information for users of the hosted network. In example embodiments, the presence message received from the browser comprises a private message generated by the browser and sent to a server/presence channel handled by the channel states module 206. The channel states module 206 determines affected channels and associated presence state changes for the affected channels from the presence message.

The presence storage 208 comprises any storage device or storage mechanism that maintains presence information. For example, the presence storage 208 may be a cache, a database, or a hash table. In the hash table embodiment, the hash table may comprise a mapping of session identifiers, user identifiers, client identifiers, and channel attributes. The session identifier is a cookie value for a web application session, and the user identifier is derived from the session identifier. For example, a lookup process may be performed at the web server 110 to determine the user identifier. The client identifier is assigned by the Comet server 106 for the duration of the Comet connection and corresponds to a browser tab.

The channel attributes identify the channel that corresponds to where the client (e.g., the browser of the user) is online or active. The channel attributes may be a name of an arbitrary channel which conveys a status or state. In example embodiments, two conventions for channel attributes are used. The first is directed to a user identifier to indicate the channel where the user is online. The second is directed to an activity to indicate the channel containing the online users who are also active in the activity (e.g., activityID). Thus, a user may subscribe to any number of user channels and activity channels in order to obtain presence status for specific users or for all users within a specific activity, respectively. However, the user, in accordance with one embodiment, is allowed to subscribe to channels for which the user is a member of the activity or for users associated with these activities. In this manner, the presence state is provided to select subscribers (e.g., fellow group/activity members).

It is noted that multiple browsers may be open at the same time at the user device 102. In this case, presence information in the presence storage 208 may indicate multiple presence states for a user.

In example embodiments, the presence state may include offline (e.g., not logged in), online (e.g., logged in somewhere in the hosted network such as on a profile page or other activity), and active. An "active" state indicates that the user is online and working (e.g., viewing or editing) within an activity of which a subscriber has subscribed to the corresponding channel. An "online" state may be provided if the user is online and working within an activity to which a subscriber has not subscribed. For example, a subscriber subscribes to an Activity20 channel for User5, but User5 is only active in Activity15. Thus, the subscriber will only get an indication that User5 is "online." However, if User5 becomes active in Activity20, the subscriber will receive a presence update indicating that User5 is now "active" in Activity20.

In further embodiments, the presence information may include more details. For example, in channels where the user is active, presence information may be provided that indicates what the user is doing within the activity (e.g., viewing a document, adding an image, editing a document, using a business tool). Other presence information that may be provided include, for example, time online, time active in the activity, and actions performed within the activity since beginning of current session. Additionally, further embodiments may include presence states such as "away" (e.g., inactive for a certain period of time, but still logged in), "do not want to share," or "editing an item."

The presence communication module 210 performs communication exchanges with the browsers of users and subscribers. For instance, the presence communication module 210 receives the published presence information from the browser 104 and provides the published presence information to the channel states module 206 for processing. The presence communication module 210 also pushes the presence information comprising presence state changes to subscribers.

Figure 3:
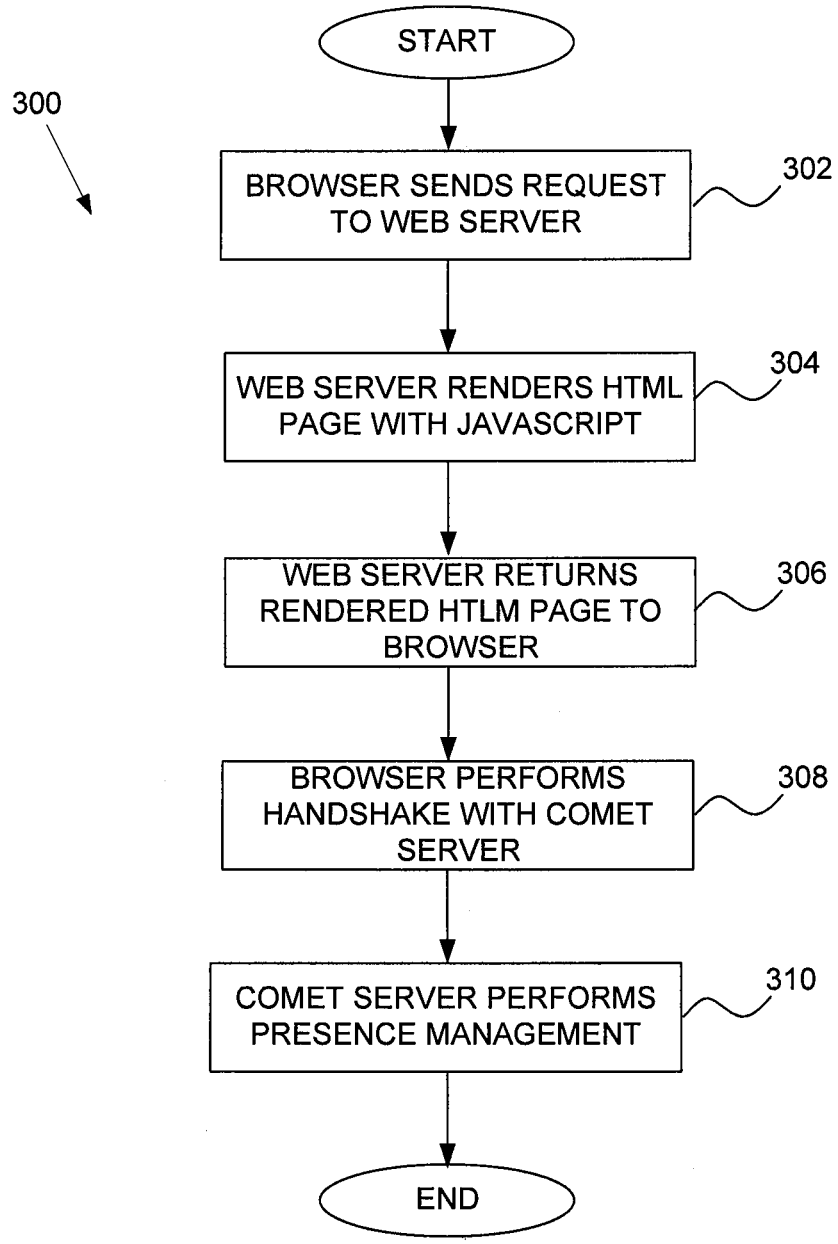
FIG. 3 is a flowchart of an example method to trigger presence management.

FIG. 3 is a flowchart 300 of an example method to trigger presence management. The method may occur when a user first logs into the hosted network and attempts to access data. In operation 302, the browser 104 sends an HTTP request to the web server 110 for the data.

In operation 304, the web server 110 renders an HTML including the requested data. The HTML may further include JavaScript or links to JavaScript files associated with presence management. The HTML 112 is then returned to the browser 104 in operation 306.

In operation 308, the browser 104 may perform a handshake with the Comet server 106 and establish a protocol. The protocol enables connection and tracking of user presence in the hosted network.

Once the protocol is established, online presence management may be triggered in operation 310. Presence management comprises receiving published presence information from the browser 104, which will be discussed in more detail in connection with FIG. 4. Presence management further comprises providing presence information to subscribers, which will be discussed in more detail in connection with FIG. 5.

Figure 4:
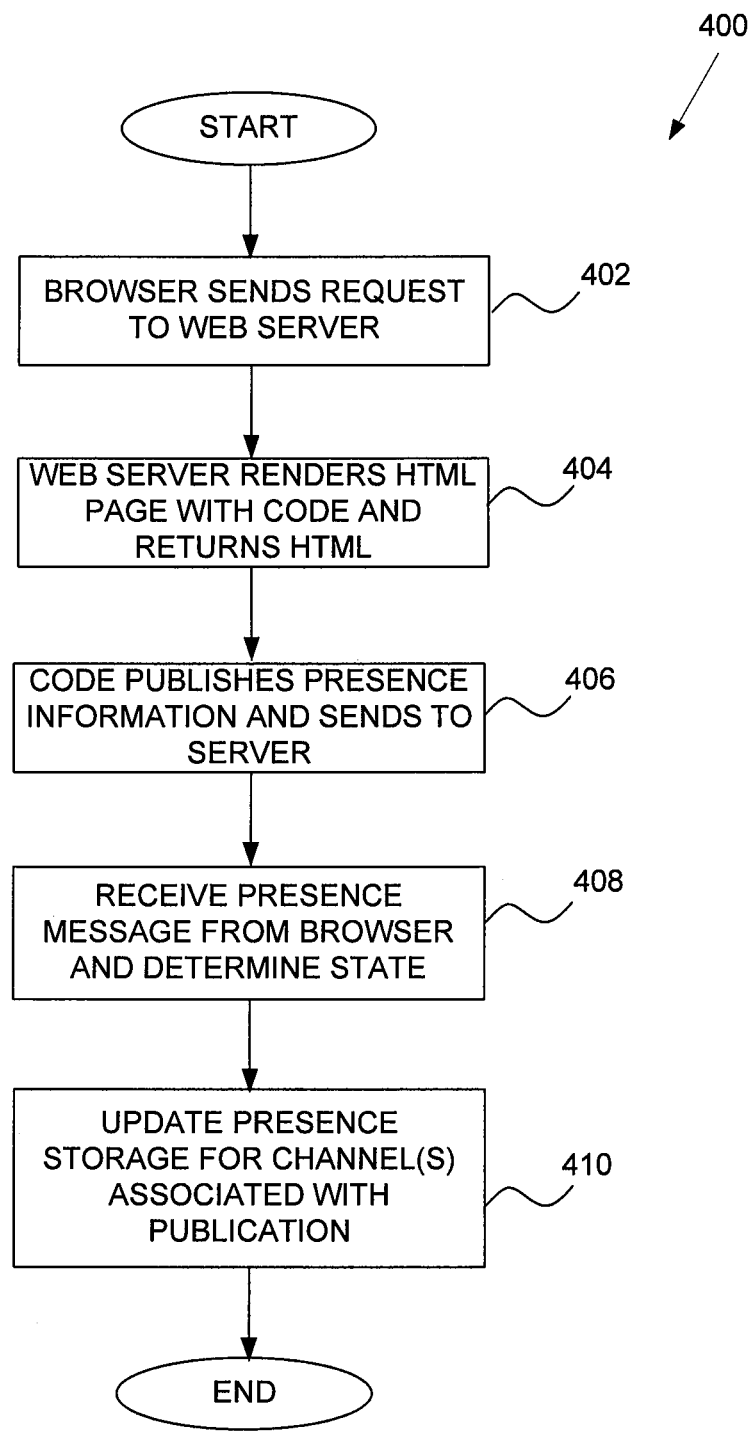
FIG. 4 is a flowchart of an example method to determine presence states for a user.

FIG. 4 is a flowchart 400 of an example method to determine presence state of a user. In operation 402, a browser associated with the user sends an HTTP request to the web server 110. The HTTP request may be associated with a navigation within the hosted network (e.g., between activities, profile page, or any other location of the hosted network) or a logoff from the hosted network, for example.

The web server 110 renders an HTML page with a code (e.g., JavaScript) in response to the HTTP request and returns the HTML page to the requesting browser 104 in operation 404. The browser 104 loads and displays the HTML page. The loading of the code on the browser 104 may cause publication of a message indicating a presence state change of the user in operation 406. For example, if the user (e.g., having a user identifier User5) logs out of the hosted network, the code in the HTML page sends a message to the Comet server 106 to indicate a disconnect. In an example where the user navigates from an activity (e.g., Activity20) to a non-activity (e.g., a profile page), the code causes the browser to publish a message indicating the navigation (e.g., online and inactive in Activity20).

It is noted that in examples where the user's presence does not change (e.g., HTTP request for data within a same activity), the code is not triggered to publish a presence message. Thus, the network traffic is reduced since only presence state changes are published to the Comet server 106.

In operation 408, the Comet server 106 receives the presence message from the browser 104 and determines the presence state change from the presence message. In the logoff example, the Comet server 106 detects that the user is no longer present on the User5 channel and Activity20 channel. For the page navigation example where the user navigates from the activity to the profile page, the Comet server 106 will detect that the user is still present on the User5 channel but is no longer active in the Activity20 channel. In operation 410, the user's presence information is updated in the presence storage 208. Subsequently, the Comet server 106 broadcasts presence state changes to relevant subscribers as is described in more detail in connection with FIG. 5.

In an embodiment where a system crash occurs at the user device 102, a timeout period may be imposed. For example, if after two minutes the Comet server 106 detects that there is no browser 104 present, the Comet server 106 will update the presence storage 208 and, as will be discussed in FIG. 5, broadcast presence (change) information to online subscribers of the affected channel(s).

Figure 5:
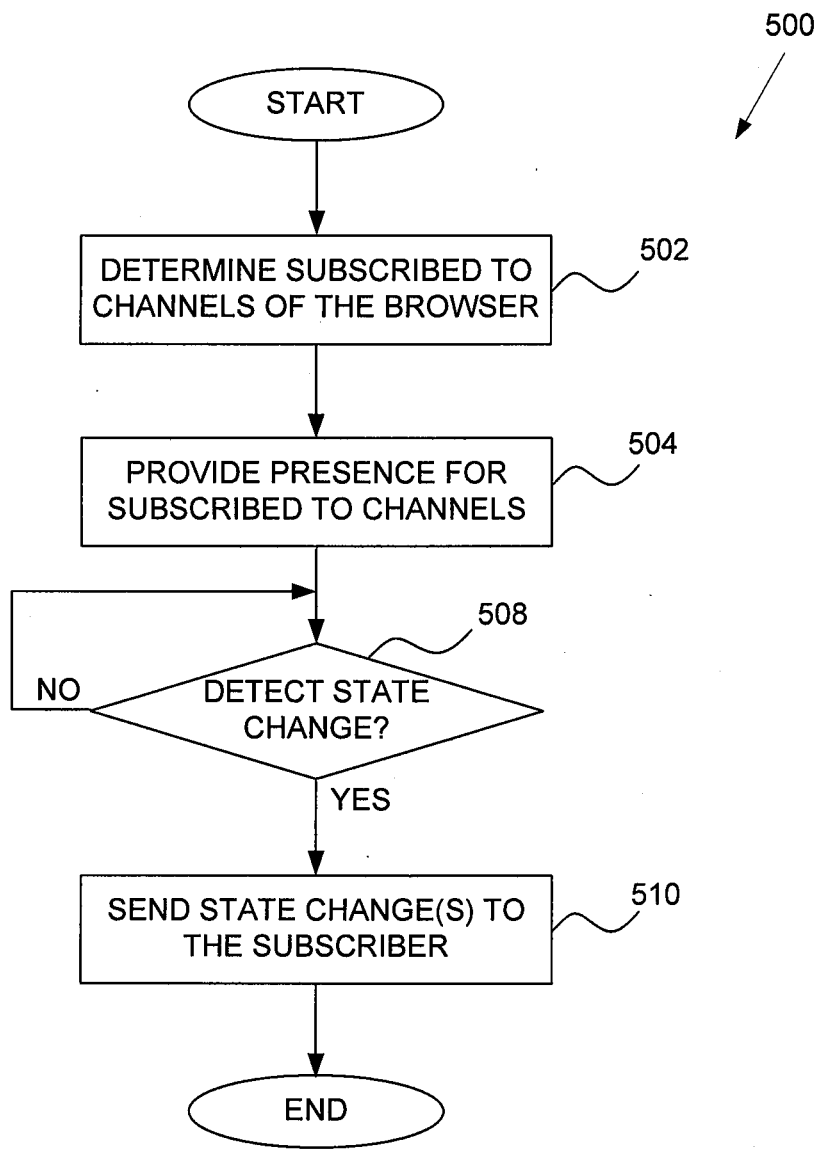
FIG. 5 is a flowchart of an example method to provide presence information to subscribers.

FIG. 5 is a flowchart 500 of an example method to provide presence state to a subscriber at a browser 104. When the subscriber initially logs onto the hosted network, the channel subscription module 204 determines all channels the subscriber subscribes to in operation 502. The channels may comprise user channels, activity channels, or a combination of both.

State information for each of the subscribed to channels is determined and provided to the subscriber in operation 504. In example embodiments, the channel states module 206 accesses a presence storage 208 and determines the presence information for the channels determined in operation 502.

If a presence state change is detected in operation 508, then the presence information related to the presence state change is provided to the subscriber in operation 510. The detection of state change in operation 508 may occur in operation 408 of FIG. 4. That is, when the state change is detected in operation 408, the Comet server 106 broadcasts a notification indicating the presence (state change) information to all online subscribers of the channel(s) in which the presence state change is detected. Because the presence information is broadcast (e.g., pushed to the browser 104) when a presence state change occurs, network traffic may be reduced over conventional presence management systems which continuously broadcast presence information.

Figure 6:
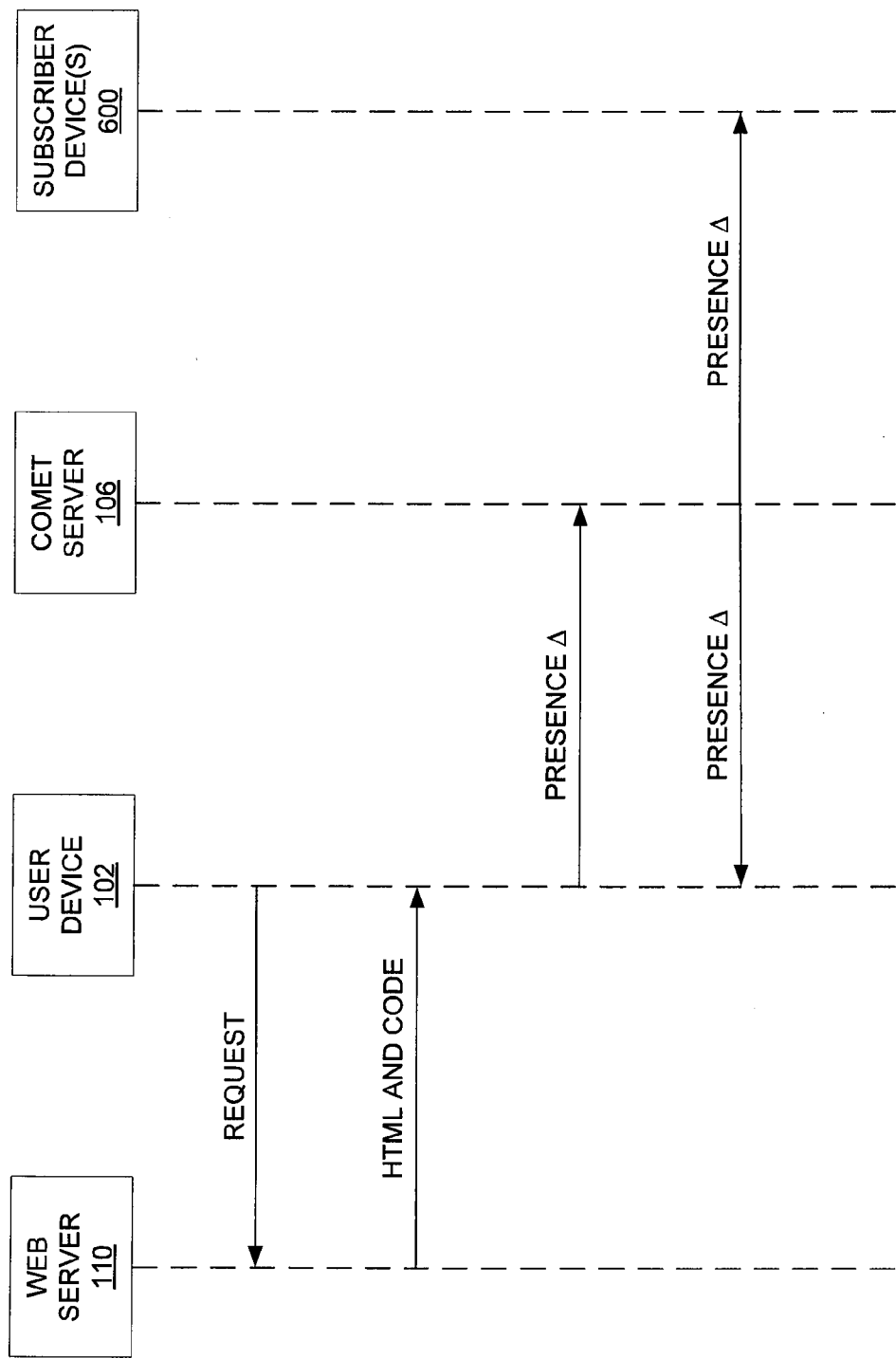
FIG. 6 is a sequence diagram depicting communication flows within example embodiments.

FIG. 6 is a sequence diagram depicting communication flows within example embodiments. Initially, the browser 104 of the user device 102 associated with a user sends an HTTP request to the web server 110. The HTTP request may be associated with a login to the hosted network, navigation within the hosted network (e.g., between activities, profile page, or any other location of the hosted network), or a logoff from the hosted network. In response, the web server 110 renders an HTML page with a code (e.g., JavaScript).

The HTML and code is returned to the user device 102 where the browser 104 loads and displays the HTML page. In cases where the presence state changes, the loading of the code causes publication of a message indicating a presence state change. For example, if the user (e.g., having a user identifier User5) logs out of the hosted network, the code sends a presence message to the Comet server 106 to indicate a disconnect. In example embodiments, the presence message comprises presence state change information (e.g., a change from "online" to "away", a change from "online" to "active", or any other states that may be defined). If the user's presence does not change (e.g., HTTP request for data within a same activity), the code is not triggered to publish the presence message. The Comet server 106 receives the presence message from the user device 102 determines the presence state change from the presence message. In the logoff example, the Comet server 106 detects that the user is no longer present on the User5 channel and Activity20 channel.

Since example embodiments provide presence messages when the presence state changes, detection of state change is automatic and will trigger the Comet server 106 to determine affected subscribers. The Comet server 106 broadcasts a notification indicating the presence (state change) information to subscriber devices 600 of all online subscribers of the channel(s) in which the presence state change has occurred. The Comet server 106 also may return the presence state change to the user device 102 since the user device 102 is an instance of the subscriber devices 600. Accordingly, in an example embodiment, only a state change is communicated between the various devices (e.g., user device 102, Comet server 106, subscriber device 600, or any other devices).

For a better understanding of example embodiments, FIG. 7a-FIG. 7d provide a graphical illustration of an example embodiment of the method of FIG. 5. FIG. 7a depicts a list of channels for User5. User5 may be assigned a User5 channel, which is User5's presence channel on the hosted network. Additionally, User5 is a member of Activity15, Activity17, and Activity20. As such, corresponding (presence) channels for each of these activities are associated with User5.

Subsciber1 is also a member of Activity15 and Activity 20. Therefore, Subscriber1 subscribes to these channels. However, Subscriber1 is not a member of Activity17, and cannot subscribe to the Activity17 channel. Alternatively, Subscriber1 may be a member of Activity17, but chooses not to subscribe to the Activity17 channel (e.g., marked as "not subscribed"). Similarly, Subscriber2 has subscribed to the User5 channel and the Activity15 channel. It is noted that User5 may be a subscriber to channels, such as the Activity15 channel, Activity17 channel, or Activity20 channels as well as user channels (e.g., user channels of Subscriber1, Subscriber2, and other users in the same activities as User5).

While embodiments have been described in which subscribers are only allowed to subscribe to channels associated with activities in which the subscribers are members, it is noted that alternative embodiments may contemplate allowance for subscription to channels in which the subscriber is not a member of the corresponding activity.

Referring now to FIG. 7b, User5 logs onto the hosted network and performs some action in Activity20 (whereby active activities are indicated in bold). When User5 first logs on and accesses data on Activity20, a presence message is sent to the user presence engine 202 that will indicate the state change (e.g., online and active in Activity20). When this occurs, subscribers that subscribe to the User5 channel and the Activity20 channel will receive the presence state change. In the present case, Subscriber1 will receive presence information indicating that User5 is online and active in Activity20. However, since Subscriber2 does not subscribe to the Activity20 channel, Subscriber2 only receives presence information indicating that User5 is online.

User5 may be active in more than one activity at a time (e.g., has multiple browsers opened to different activities). FIG. 7c depicts a case where User5, who was previously active in Activity20 (as shown in FIG. 7b), opens a new browser and performs an action in Activity15. The initial access to Activity15 will trigger a presence message to the user presence engine 202. Based on the presence state change, Subscriber1 receives presence information indicating that User5 is active on Activity15. The presence information on Subscriber1's browser will now indicate that User5 is online and active in Activity15 and Activity20. Similarly, Subscriber2 receives presence information indicating that User5 is active on Activity15 and the browser will now indicate User5 is online and active in Activity 15.

When User5 leaves an activity, a presence message is sent to the user presence engine 202 indicating the presence state change. As shown in FIG. 7d, User5 leaves Activity20 and becomes active in Activity 17. The user presence engine 202 detects the presence state change and forwards the presence state change information to subscribers of the affect channel, the Activity20 channel and Activity17 channel. In the present case, Subscriber1 receives presence information that will remove the active state from Activity20. However, Subscriber1 will still have the online and active in Activity15 states unchanged. Because Subscriber2 did not subscribe to the Activity20 channel or the Activity 17 channel, the change in states with respect to Activity20 and Activity17 do not affect Subscriber2. Therefore, Subscriber2 does not receive a presence information message with the presence state change.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or programmable logic array (PLA)) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
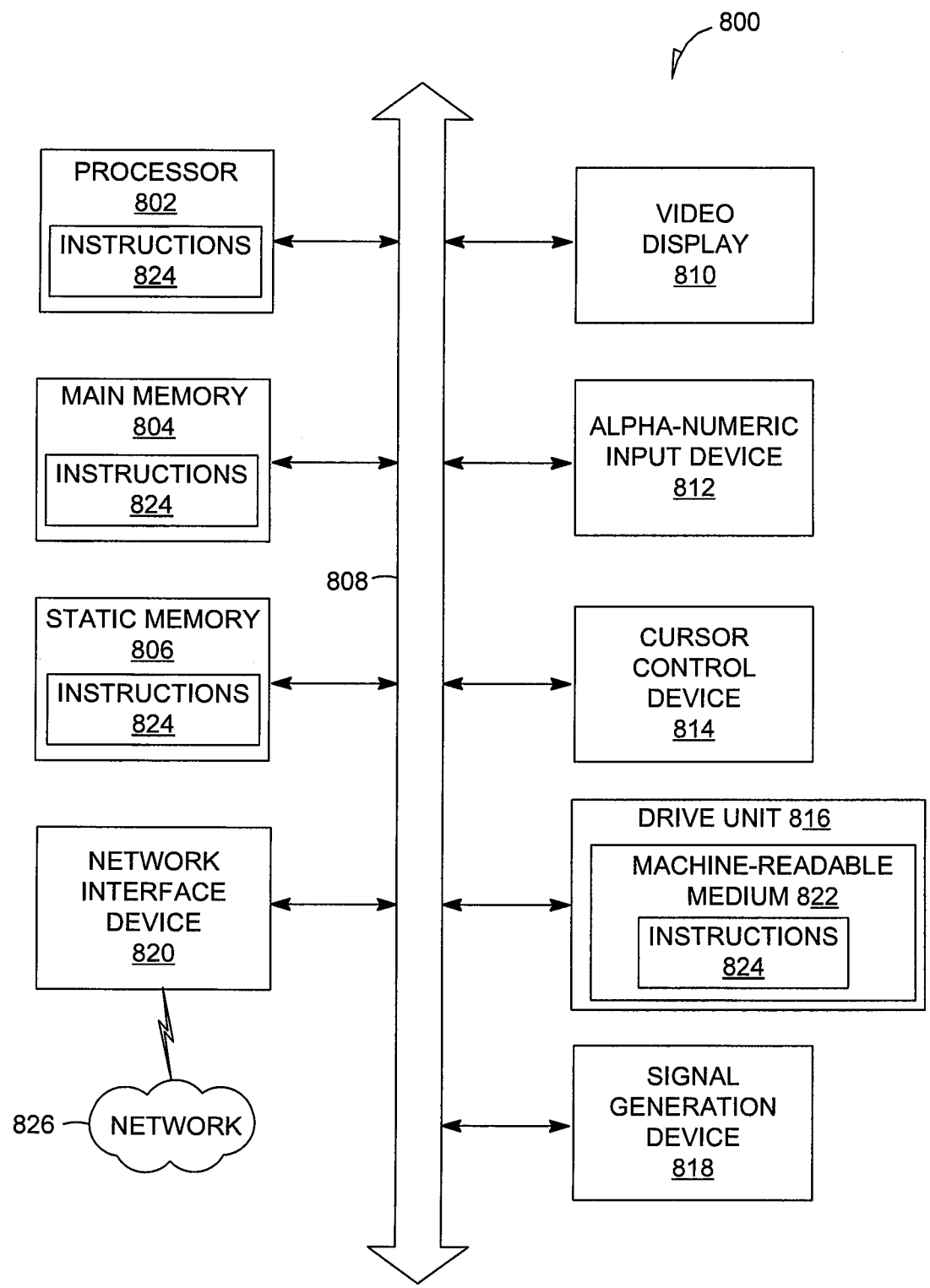
FIG. 8 is a simplified block diagram of a machine in an example form of a computing system within which a set of instructions for causing the machine to perform any one or more of the methodologies discussed herein may be executed.

With reference to FIG. 8, an exemplary embodiment extends to a machine in the example form of a computer system 800 within which instructions for causing the machine to perform any one or more of the methodologies discussed herein may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In exemplary embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable storage medium 822 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled. For example, while particular components are provided in the presence management system (e.g., web server, Comet server), those skilled in the art will appreciate that other similar components may be used to obtain similar functionalities provided by example embodiments.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, at a server, an IMP request from a browser associated with a device of a user, the HTTP request being associated with a navigation within a hosted network;
   in response to the HTTP request, rendering and returning to the device of the user an HTML page with code, the code causing publication of a presence message, by the browser, to indicate a presence state change;
   receiving, at the server, the presence message from the browser, the user being associated with a plurality of channels, the plurality of channels being communication channels including both a user presence channel indicating a presence of the user on a networked system and one or more activity channels each corresponding to an activity comprising a group of members in which the user is simultaneously a member and can perform work within, the user presence channel being distinct from the one or more activity channels;
   identifying, by the server, a presence state change indicated in the presence message;
   determining, by the server, an activity channel of the plurality of channels associated with the user affected by the presence state change;
   determining, by the server, a subscriber that subscribed to one or more of the plurality of channels associated with the user, the subscriber having explicitly subscribed to the one or more of the plurality of channels and being distinct from a member of the activity;
   determining, by the server, whether the subscriber subscribed to the activity channel affected by the presence state change; and
   electronically transmitting, using one or more processors of the server, presence information indicating the presence state change to a device of the subscriber for display on the device of the subscriber, a type of the presence information electronically transmitted to the device of the subscriber being based on the determining whether the subscriber subscribed to the activity channel, the presence information causing the device of the subscriber to display either:
   an online indication based on the subscriber not having explicitly subscribed to the activity channel affected by the presence state change, or
   an active indication based on the subscriber having explicitly to the activity channel affected by the presence state change.

2. The method of claim 1, wherein the active indication caused to be displayed on the device of the subscriber further comprises an indication that the user is viewing a document, editing a document, adding an image, or using a business tool within the activity channel.

3. The method of claim 1, wherein the activity is one or more of a project group, common interest group, social networking group, committees, boards, company teams, intercompany teams, or standards groups.

4. The method of claim 1, further comprising maintaining presence states in a presence storage, the presence storage being updated with the one or more presence state changes.

5. The method of claim 1, wherein the receiving of the presence message is triggered when the one or more presence state changes occur on the browser.

6. The method of claim 1, further comprising sharing the presence information with other coupled servers via an active message queue.

7. The method of claim 1, wherein the electronically transmitting of the presence information comprises pushing the presence information to browsers of the subscribers without an explicit request from the browsers.

8. The method of claim 1, further comprising establishing a new channel associated with a new activity and managing invitations to join the new activity.

9. The method of claim 1, wherein the presence information comprises an offline presence based on a timeout period.

10. The method of claim 1, wherein the browser only transmits the presence message when there is a change in the presence state associated with the user.

11. The method of claim 1, wherein the active indication caused to be displayed on the device of the subscriber further comprises an indication of actions performed within the activity channel since a beginning of a current session.

12. The method of claim 1, wherein the subscriber is a member of the activity and explicitly subscribes to the activity channel for the activity in order to receive presence state information for the activity channel.

13. A system comprising:
   one or more hardware processors configure to:
   receive an HTTP request from a browser associated with a device of a user, the HTTP request being associated with a navigation within a hosted network;
   in response to the HTTP request, render and return to the device of the user an HTML page with code, the code causing publication of a presence message, by the browser, to indicate a presence state change;
   receive the presence message from the browser, the user being associated with a plurality of channels, the plurality of channels being communication channels including both a user presence channel indicating a presence of the user on a networked system and one or more activity channels each corresponding to an activity comprising a group of members in which the user is simultaneously a member and can perform work within, the user presence channel being distinct from the one or more activity channels;

identify a presence state change indicated in the presence message and to determine an activity channel of the plurality of channels associated with the user affected by the presence state change; and determine a subscriber that subscribed to one or more of the plurality of channels associated with the user, determine whether the subscriber subscribed to the activity channel affected by presence state change, the subscriber having explicitly subscribed to the one or more of the plurality of channels and being distinct from a member of the activity, electronically transmit presence information indicating the presence state change to a device of the subscriber for display on the device of the subscriber, a type of the presence information electronically transmitted to the subscriber being based on the determining whether the subscriber subscribed to the activity channel, the presence information causing the device of the subscriber to display either:

an online indication based on the subscriber not having explicitly subscribed to the activity channel affected by the presence state change, or an active indication based on the subscriber having explicitly subscribed to the activity channel affected by the presence state change.

14. The system of claim 13, wherein the active indication caused to be displayed on the device of the subscriber further comprises an indication that the user is viewing a document, editing a document, adding an image, or using a business tool within the activity channel.

15. The system of claim 13, wherein the presence information is electronically transmitted by pushing the presence information to browsers of the subscribers without an explicit request from the browsers.

16. The system of claim 13, wherein the active indication caused to be displayed on the device of the subscriber further comprises an indication of actions performed within the activity channel since a beginning of a current session.

17. A non-transitory machine-readable storage medium storing instructions which, when executed by the at least one processor of a machine, cause the machine to perform operations comprising:

receiving an HTTP request from a browser associated with a device of a user, the HTTP request being associated with a navigation within a hosted network;

in response to the HTTP request, rendering and returning to the device of the user an HTML page with code, the code causing publication of a presence message, by the browser, to indicate a presence state change;

receiving the presence message from the browser, the user being associated with a plurality of channels, the plurality of channels being communication channels including both a user presence channel indicating a presence of the user on a networked system and one or more activity channels each corresponding to an activity comprising a group of members in which the user is simultaneously a member and can perform work within, the user presence channel being distinct from the one or more activity channels;

identifying a presence state change indicated in the presence message;

determining an activity channel of the plurality of channels associated with the user affected by the presence state change;

determining a subscriber that subscribed to one or more of the plurality of channels associated with the user, the subscriber having explicitly subscribed to the one or more of the plurality of channels and being distinct from a member of the activity;

determining whether the subscriber subscribed to the activity channel affected by the presence state change; and electronically transmitting presence information indicating the presence state change to a device of the subscriber for display on the device of the subscriber, a type of the presence information electronically transmitted to the subscriber being based on the determining whether the subscriber subscribed to the activity channel, the presence information causing the device of the subscriber to display either:

an online indication based on the subscriber not having explicitly subscribed to the activity channel affected by the presence state change, or an active indication based on the subscriber having explicitly subscribed to the activity channel affected by the presence state change.

18. The non-transitory machine-readable storage medium of claim 17, wherein the electronically transmitting of the presence information comprises pushing the presence information to browsers of the subscribers without an explicit request from the browsers.

19. The non-transitory machine-readable storage medium of claim 17, wherein the receiving of the presence message is triggered when the one or more presence state changes occur on the browser.

20. The non-transitory machine-readable storage medium of claim 17, wherein the operations further comprise establishing a new channel associated with a new activity and managing invitations to join the new activity.

21. The non-transitory machine-readable storage medium of claim 17, wherein the active indication caused to be displayed on the device of the subscriber further comprises an indication of actions performed within the activity channel since a beginning of a current session.

22. The non-transitory machine-readable storage medium of claim 17, wherein the active indication caused to be displayed on the device of the subscriber further comprises an indication that the user is viewing a document, adding an image, editing a document, or using a business tool.

23. A method comprising:

using one or more processors, monitoring user interaction by a user on a hosted network;

detecting a change in a presence state associated with the user, the user being associated with a plurality of channels, the plurality of channels being communication channels including both a user presence channel indicating a presence of the user on a networked system and at least one activity channel associated with an activity comprising a group of members for which the user is simultaneously a member and can perform work within, the change in the presence state being in an activity channel of the plurality of activity channels;

determining a subscriber that subscribed to one or more of the plurality of channels associated with the user subscriber having explicitly subscribed to the one or more of the plurality of channels and being distinct from a member of the activity;

determining whether the subscriber subscribed to the activity channel affected by the presence state change; and electronically transmitting presence information indicating the presence state change for display to the subscriber, a type of the presence information electronically transmitted for display to the subscriber being based on the determining whether the subscriber explicitly subscribed to the activity channel, the presence information causing a device of the subscriber to display either:
an online indication based on the subscriber not having explicitly subscribed to the activity channel affected by the presence state change, or
an active indication based on the subscriber having explicitly subscribed to the activity channel affected by the presence state change.

\* \* \* \* \*